(12) United States Patent
Chiang et al.

(10) Patent No.: US 8,320,438 B2
(45) Date of Patent: Nov. 27, 2012

(54) EVALUATION DEVICE FOR PROVIDING A TRANSCEIVER SYSTEM WITH PERFORMANCE INFORMATION THEREOF

(75) Inventors: Ching-Tai Chiang, Dashu Township (TW); Rong-Ching Wu, Dashu Township (TW); Chen-Sen Ouyang, Dashu Township (TW); Jong-Ian Tsai, Dashu Township (TW)

(73) Assignee: I Shou University, Kaohsiung County (TW)

( * ) Notice: Subject to any disclaimer, the term of this patent is extended or adjusted under 35 U.S.C. 154(b) by 135 days.

(21) Appl. No.: 12/952,712

(22) Filed: Nov. 23, 2010

(65) Prior Publication Data

US 2012/0128051 A1    May 24, 2012

(51) Int. Cl.
*H04B 3/46* (2006.01)
(52) U.S. Cl. ........ 375/227; 375/260; 375/267; 375/299; 375/347; 375/349
(58) Field of Classification Search .................. 375/227, 375/260, 267, 299, 347, 349
See application file for complete search history.

(56) References Cited

U.S. PATENT DOCUMENTS

| | | | |
|---|---|---|---|
| 2005/0237971 A1* | 10/2005 | Skraparlis | 370/329 |
| 2008/0205538 A1* | 8/2008 | Han et al. | 375/267 |
| 2009/0245408 A1* | 10/2009 | Mujtaba et al. | 375/267 |
| 2011/0261898 A1* | 10/2011 | Huang et al. | 375/295 |
| 2011/0291891 A1* | 12/2011 | Nsenga et al. | 342/373 |

* cited by examiner

*Primary Examiner* — Kabir A Timory
(74) *Attorney, Agent, or Firm* — Steptoe & Johnson LLP (57) ABSTRACT

An evaluation device is adapted for providing a transceiver system with performance information thereof. The transceiver system includes a transmitter and at least one receiver, and models a channel between the transmitter and the receiver using Nakagami distribution with a fading parameter. The evaluation device includes a signal-to-noise ratio (SNR) setting module, an error rate computing module, and an output module. The SNR setting module is operable to set an average SNR for the channel between the transmitter and the receiver of the transceiver system. The error rate computing module is operable, based upon the fading parameter, the average SNR and a number of the receiver, to compute a bit error rate over the channel between the transmitter and the receiver. The output module is operable to provide the transceiver system with the average SNR and the bit error rate as the performance information of the transceiver system.

13 Claims, 6 Drawing Sheets

EVALUATION DEVICE FOR PROVIDING A TRANSCEIVER SYSTEM WITH PERFORMANCE INFORMATION THEREOF

BACKGROUND OF THE INVENTION

1. Field of the Invention

The present invention relates to an evaluation device for providing a transceiver system with performance information thereof, more particularly to an evaluation device for providing a transceiver system, which models a channel thereof using Nakagami distribution, with performance information thereof.

2. Description of the Related Art

Figure 1:
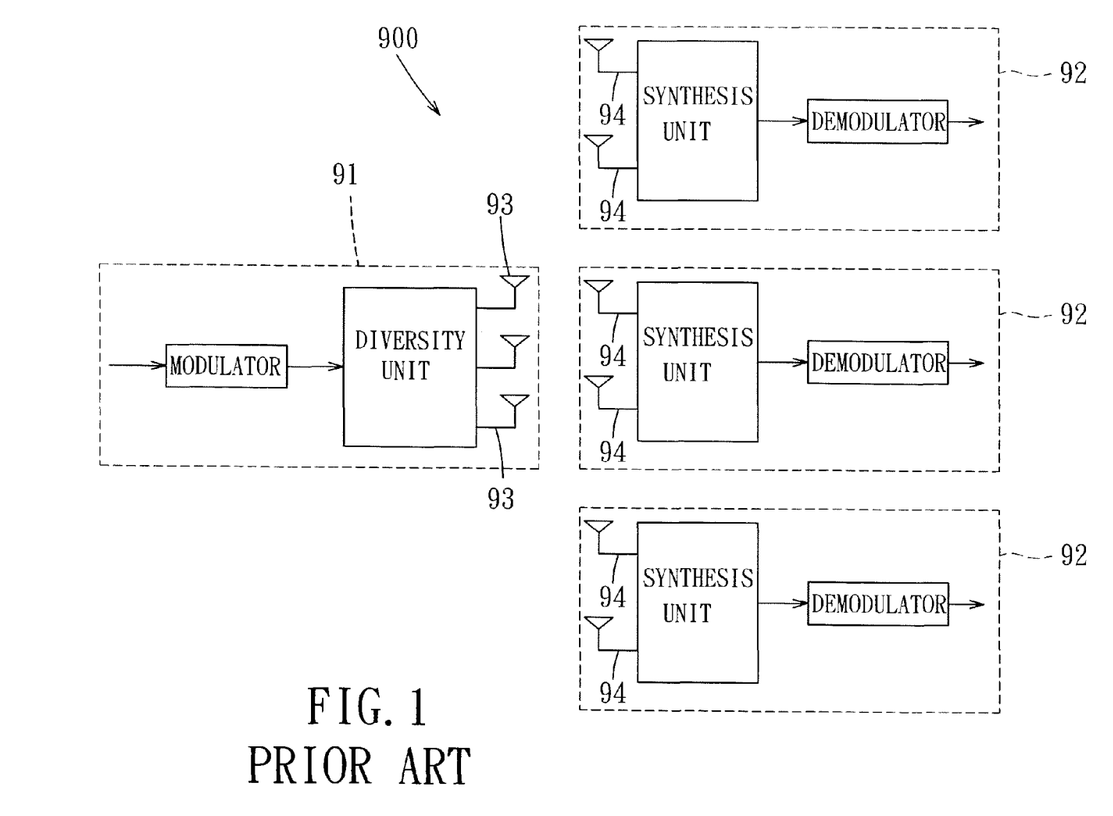
FIG. 1 is a block diagram illustrating a conventional transceiver system.

Referring to FIG. 1, a transceiver system 900 under a multiuser diversity scheme includes a transmitter 91 and a plurality of receivers 92. The transmitter 91 includes a plurality of transmit antennas 93, and the receiver 92 includes a plurality of receive antennas 94. Under the multiuser diversity scheme, the transmitter 91, such as a base station, is capable of communication with the receivers 92, such as cell phones of users.

Further, when the transceiver system 900 utilizes a transmit selective combining/receive maximum ratio combining (SC/MRC) scheme as an antenna scheme thereof, each of the receivers 92 is operable, in advance, to estimate the channels between the transmitter 91 and itself so as to determine which one of the transmit antennas 93 results in a channel that has relatively better performance. According to the evaluation results from the receivers 92, the transmitter 91 is operable to communicate with a selected one of the receivers 92, and to transmit signals to the selected one of the receivers 92 using one of the transmit antennas 93 corresponding to one of the channels that has relatively better performance. Then, the selected one of the receivers 92 is operable to weight the signals received by the receive antennas 94 thereof so as to optimize the performance of the transceiver system 900.

In "Outage probability of transmitter antenna selection/receiver-MRC over spatially correlated Nakagami-fading channels," *IEEE ICCT'06*, November 2006, pages 1-4, Wang B. Y. et al. proposed a method for evaluating performance of a transceiver system under the multiuser diversity scheme by using Nakagami channels associated with integer fading parameters to simulate an outage probability. However, when evaluations are conducted in a metropolis, the channels of the transceiver system usually fade in various levels. Therefore, the Nakagami channels only associated with integer fading parameters are inappropriate for simulation of masking, fading, or other interferences in a metropolis.

SUMMARY OF THE INVENTION

Therefore, an object of the present invention is to provide an evaluation device and method adapted for appropriately evaluating performance of a transceiver system by using Nakagami channels associated with fading parameters not limited to integers to compute an outage probability of the transceiver system.

Accordingly, an evaluation device of the present invention is adapted for providing a transceiver system with performance information thereof. The transceiver system includes a transmitter and at least one receiver, and models a channel between the transmitter and the receiver using Nakagami distribution with a fading parameter. The evaluation device includes a signal-to-noise ratio (SNR) setting module, an error rate computing module, and an output module.

The SNR setting module is operable to set an average SNR for the channel between the transmitter and the receiver of the transceiver system. The error rate computing module is operable, based upon the fading parameter, the average SNR and a number of the receiver, to compute a bit error rate over the channel between the transmitter and the receiver. The output module is operable to provide the transceiver system with the average SNR and the bit error rate as the performance information of the transceiver system.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 2:
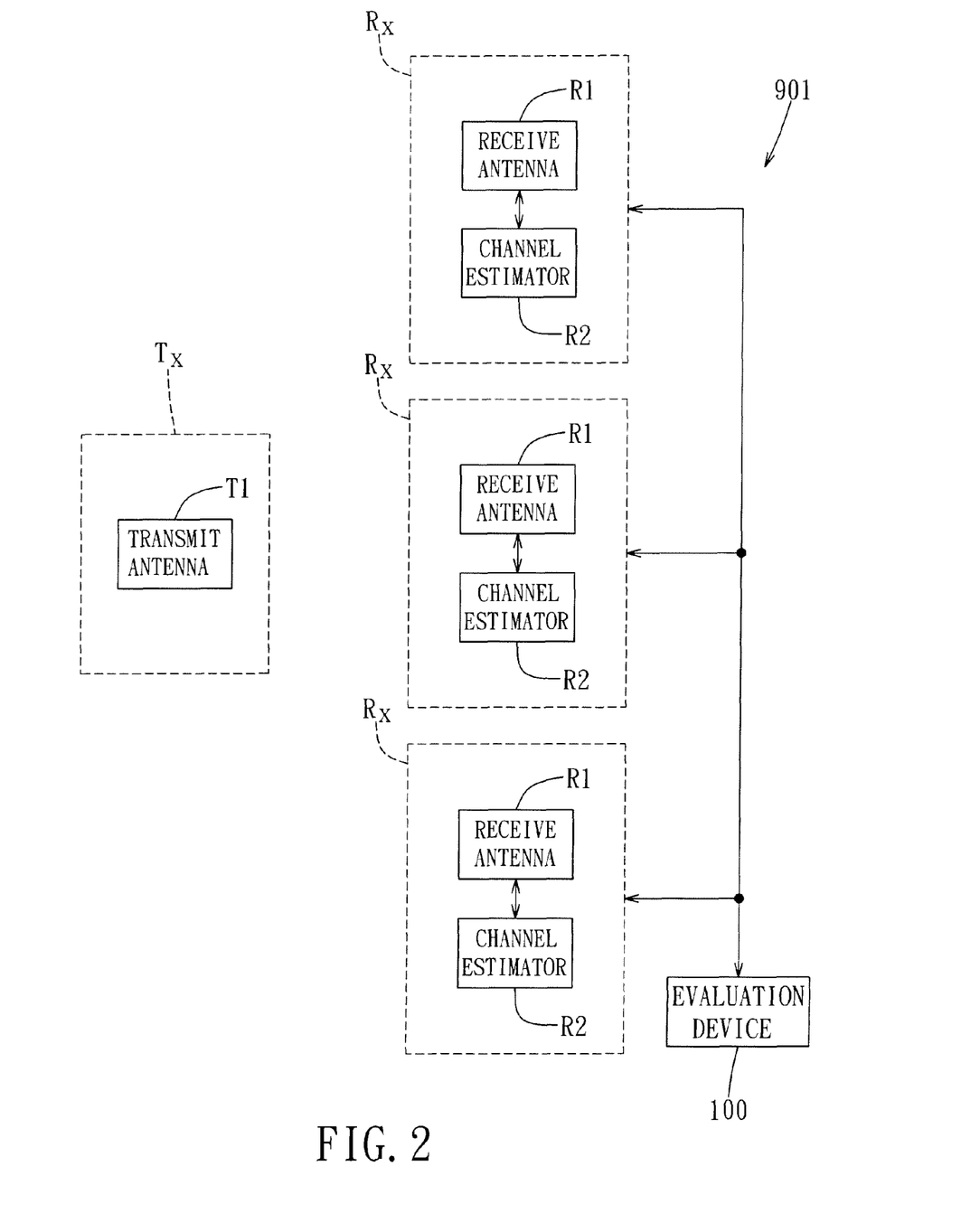
FIG. 2 is a block diagram illustrating a single-input single-output transceiver system under a multiuser diversity scheme.

Referring to FIG. 2, a first preferred embodiment of an evaluation device 100 of this invention is adapted for providing a transceiver system 901 with performance information thereof. In this embodiment, the transceiver system 901 is a single-input single-output transceiver system under a multiuser diversity scheme, and includes a transmitter (Tx) and a number K (K>1) of receivers (Rx). The transceiver system 901 utilizes a modulation scheme, such as a binary phase-shift keying (BPSK) scheme, for conveying data. In practice, the transmitter (Tx) is a base station, and each of the receivers (Rx) is a cell phone of a user. For illustrative purpose, the transceiver system 901 includes three (K=3) of the receivers (Rx) in FIG. 2.

The transmitter (Tx) includes a transmit antenna (T1). Each of the receivers (Rx) includes a receive antenna (R1) and a channel estimator (R2). In this embodiment, the evaluation device 100 is operable to model a channel between the transmit antenna (T1) and the receive antenna (R1) of each of the receivers (Rx) using Nakagami distribution with an arbitrary positive fading parameter m.

The channel estimator (R2) of each of the receivers (Rx) is operable to provide the transmitter (Tx) with a transmission quality of the channel corresponding to each of the receivers (Rx). Then, according to the transmission quality, the transmitter (Tx) is operable to determine which one of the receivers (Rx) will be selected as a communication target, and to transmit a signal through the transmit antenna (T1) for transmission of the signal to the communication target. Then, the communication target is operable to receive the signal as a received signal through the receive antenna (R1) thereof. It should be noted that the communication target is one of the receivers (Rx) that demonstrates the greatest transmission quality with the transmitter (Tx).

When the fading parameter m of Nakagami distribution is greater than or equal to ½, a bit error rate of BPSK in the received signal may be calculated based upon Equation (1).

$$P_{BER} = \frac{1}{2\sqrt{\pi}} \sum_{n=0}^{\infty} \frac{\alpha_n \cdot (m/\overline{Q})^{mK+n} \Gamma(mK+n+0.5)}{(1+mK/\overline{Q})^{mK+n+0.5}} \quad (1)$$

In Equation (1), $\overline{Q}$ is an average signal-to-noise ration (SNR) of the channel, $\Gamma(z)$ is a Gamma function $$\left(\Gamma(z) = \int_0^\infty t^{z-1} e^{-t} dt\right)$$

for an arbitrary positive number z, $$\alpha_0 = \left[\frac{1}{\Gamma(m+1)}\right]^K, \quad \alpha_n = \frac{1}{n}\sum_{j=1}^n \left[\frac{j(K+1)-n}{(m+1)_j} \cdot \alpha_{n-j}\right]$$

for a positive integer n, and $(m+1)_j = \Gamma(m+1+j)/\Gamma(m+1)$. For details of the Gamma function $\Gamma(z)$, one may refer to Equation (8.310.1) in "*Table of Integrals, Series, and Products*" (Academic Press, New York, 1994, 5*th* edition).

It could be appreciated from the foregoing that $\alpha_n$ are a sequence of rapidly decreasing convergent numbers, that is to say, $\alpha_{n-1}$ is much greater than $\alpha_n$. Therefore, when the average SNR $\overline{Q}$ is much greater than 1, i.e., greater than a predetermined value, Equation (1) can be simplified as Equation (2). For the procedure of this simplification, one may refer to "A simple and general parameterization quantifying performance in fading channels," Wang Z. et al., *IEEE Trans. Commun.*, August 2003, 51(8), pages 1389-1398.

$$P_{BER} \approx \frac{\Gamma(mK+0.5) \cdot (m/\overline{Q})^{mK}}{2\sqrt{\pi} \left[\Gamma(m+1)\right]^K} \quad (2)$$

When the fading parameter m of Nakagami distribution is a positive integer, the bit error rate of BPSK in the received signal may be calculated based upon Equation (3).

$$P_{BER} = \frac{1}{2\sqrt{\pi}} \sum_{i=0}^K \binom{K}{i}(-1)^i \sum_{n=0}^{i(m-1)} \frac{\beta_n \cdot (m/\overline{Q})^n \Gamma(n+0.5)}{(1+mi/\overline{Q})^{n+0.5}} \quad (3)$$

In Equation (3), $\beta_0 = 1$, $$\beta_n = \frac{1}{n} \sum_{j=1}^{\min(n,m-1)} \left[\frac{j(i+1)-n}{j!} \cdot \beta_{n-j}\right]$$

for a positive integer n, and $$\binom{K}{i} = \frac{K!}{i!(K-i)!}.$$

As shown in FIG. 2, in this embodiment, the evaluation device 100 is adapted for analyzing the received signal in the transceiver system 901 modeling the channels using the Nakagami distribution, and each of the channels has the same average SNR $\overline{Q}$.

Figure 3:
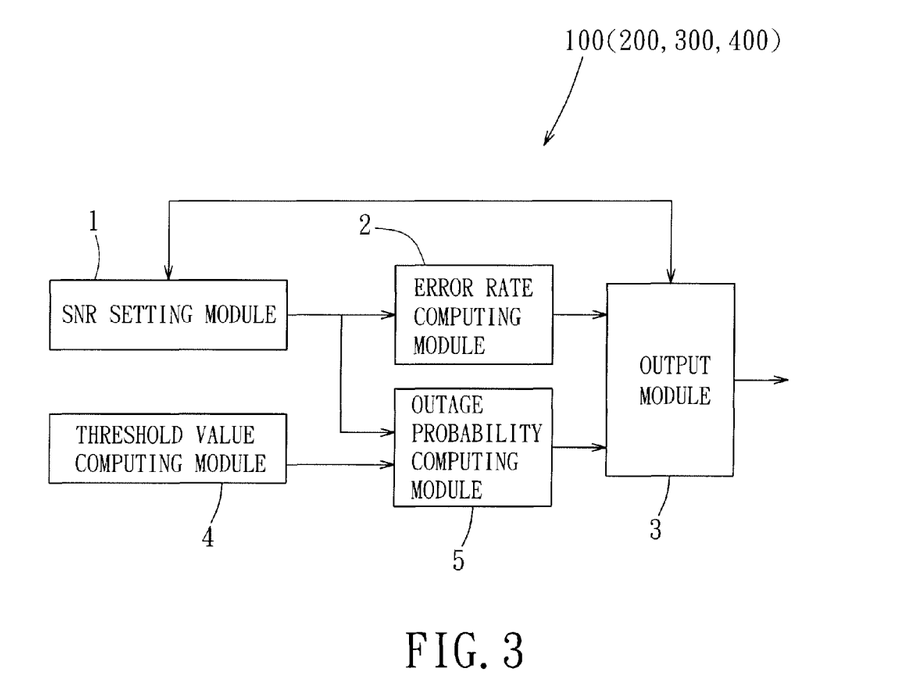
FIG. 3 is a block diagram of a first preferred embodiment of an evaluation device of the present invention.

Referring to FIG. 3, the evaluation device 100 includes an SNR setting module 1, an error rate computing module 2 coupled to the SNR setting module 1, a threshold value computing module 4, an outage probability computing module 5 coupled to the SNR setting module 1 and the threshold value computing module 4, and an output module 3 coupled to the error rate computing module 2 and the outage probability computing module 5.

The SNR setting module 1 is operable to set the average SNR $\overline{Q}$ for each of the channels between the transmitter (Tx) and the receivers (Rx) of the transceiver system 901. The threshold value computing module 4 is operable to compute a threshold value λ based upon a given capacity R. The error rate computing module 2 is operable to compute the bit error rate $P_{BER}$ of the received signal based upon the fading parameter m, the average SNR $\overline{Q}$ and the number K of the receivers (Rx). The outage probability computing module 5 is operable, based upon the fading parameter m, the number K of the receivers (Rx), the average SNR $\overline{Q}$ and the threshold value λ, to compute an outage probability of the transceiver system 901 corresponding to the given capacity R. Then, the output module 3 is operable to provide the transceiver system 901 with the average SNR $\overline{Q}$, the bit error rate $P_{BER}$ and the outage probability as the performance information of the transceiver system 901.

Figure 4:
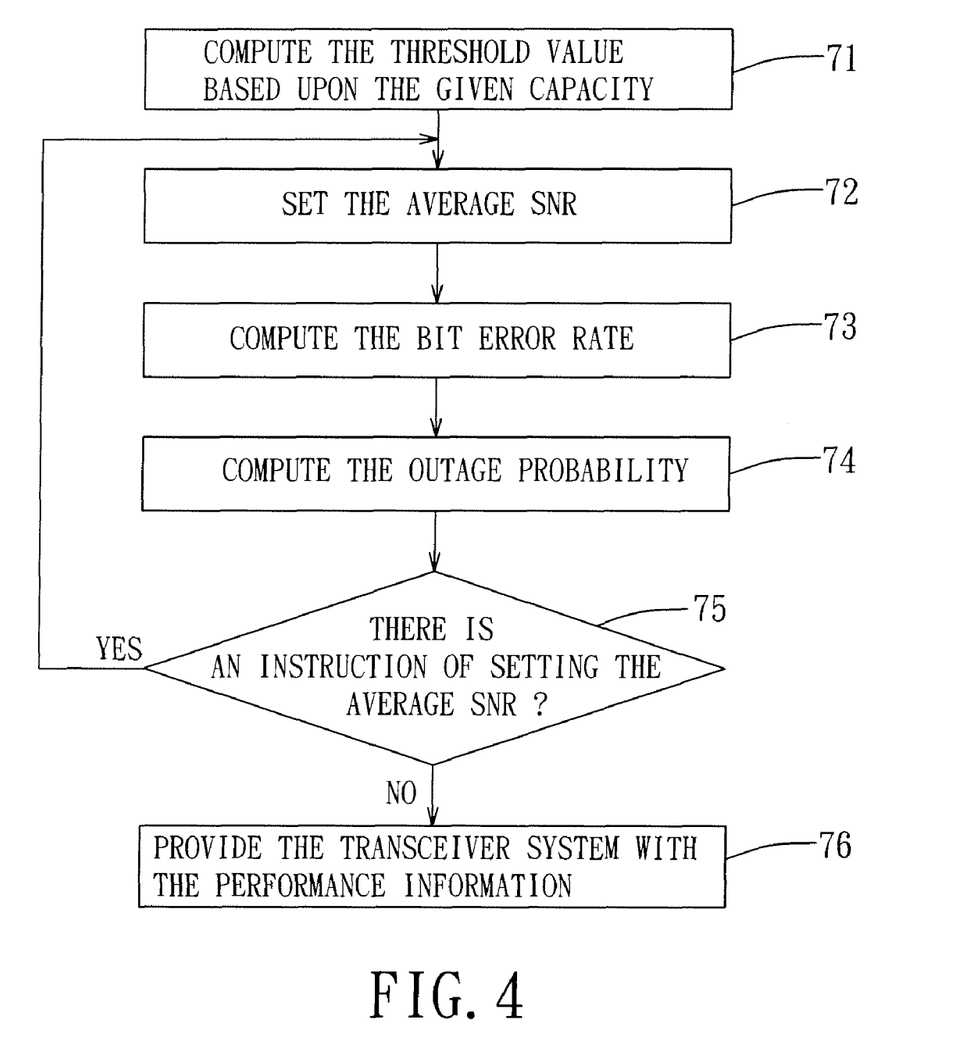
FIG. 4 is a flow chart illustrating an evaluation method implemented using the evaluation device of the first preferred embodiment.

FIG. 4 shows a flow chart of an evaluation method implemented by the evaluation device 100. The evaluation method includes the following steps.

In step 71, the threshold value computing module 4 is operable to compute the threshold value λ based upon the given capacity R ($\lambda = 2^R - 1$).

In step 72, the SNR setting module 1 is operable to set each of the channels with the same average SNR $\overline{Q}$.

In step 73, the error rate computing module 2 is operable to compute the bit error rate $P_{BER}$ based upon the fading parameter m, the average SNR $\overline{Q}$ and the number K of the receivers (Rx).

In practice, the error rate computing module 2 is operable in advance to determine whether the fading parameter m is a positive integer. The error rate computing module 2 is operable to compute the bit error rate $P_{BER}$ based upon Equation (3) when the determination is affirmative, and to compute the bit error rate $P_{BER}$ based upon Equation (1) or (2) when otherwise. In particular, when the fading parameter m is not a positive integer, the error rate computing module 2 is operable to compute the bit error rate $P_{BER}$ based upon Equation (2) if the average SNR $\overline{Q}$ is greater than a predetermined value, and to compute the bit error rate $P_{BER}$ based upon Equation (1) if the average SNR $\overline{Q}$ is not greater than the predetermined value. Further, in practice, it is impractical to calculate the summation of the infinite series $$\left(\sum_{n=0}^{\infty}\right)$$

in Equation (1). Therefore, the error rate computing module 2 is operable to compute a limited number of the series. In this embodiment, the error rate computing module 2 is operable to compute the series for n=0~50 when computing the summation.

From Equations (1) to (3), it can be appreciated that the error rate computing module 2 computes the bit error rate $P_{BER}$ based upon the average SNR $\overline{Q}$, the fading parameter m, and the number K of the receivers (Rx). Certainly, in other embodiments, the error rate computing module 2 may be operable in advance to determine whether the fading parameter m is greater than or equal to ½, and to compute the bit error rate $P_{BER}$ based upon Equation (1) or (2) when affirmative.

In step 74, the outage probability computing module 5 is operable, based upon the fading parameter m, the number K of the receivers (Rx), the average SNR $\overline{Q}$ and the threshold value λ, to compute the outage probability of the transceiver system 901 corresponding to the given capacity R.

For the procedure of the computation of the outage probability, one may refer to "Outage analysis of MIMO systems with multiuser diversity over Nakagami-m fading channels," 2009 *Fundamental Academic Conference of R.O.C. Military Academy*, pages EE.115-EE.124. Therefore, details of this computation will be omitted herein for the sake of brevity.

It should be noted that step 74 could be implemented before or simultaneously with step 73 in other embodiments.

In step 75, the output module 3 is operable to determine whether there is an instruction of setting another average SNR. The flow goes back step 72 when the determination is affirmative, and goes to step 75 when otherwise.

In step 76, the output module 3 is operable to provide the transceiver system 901 with the bit error rate $P_{BER}$ and the outage probability corresponding to each of the average SNRs $\overline{Q}$ set in step 72 as the performance information of the transceiver system 901.

Figure 5:
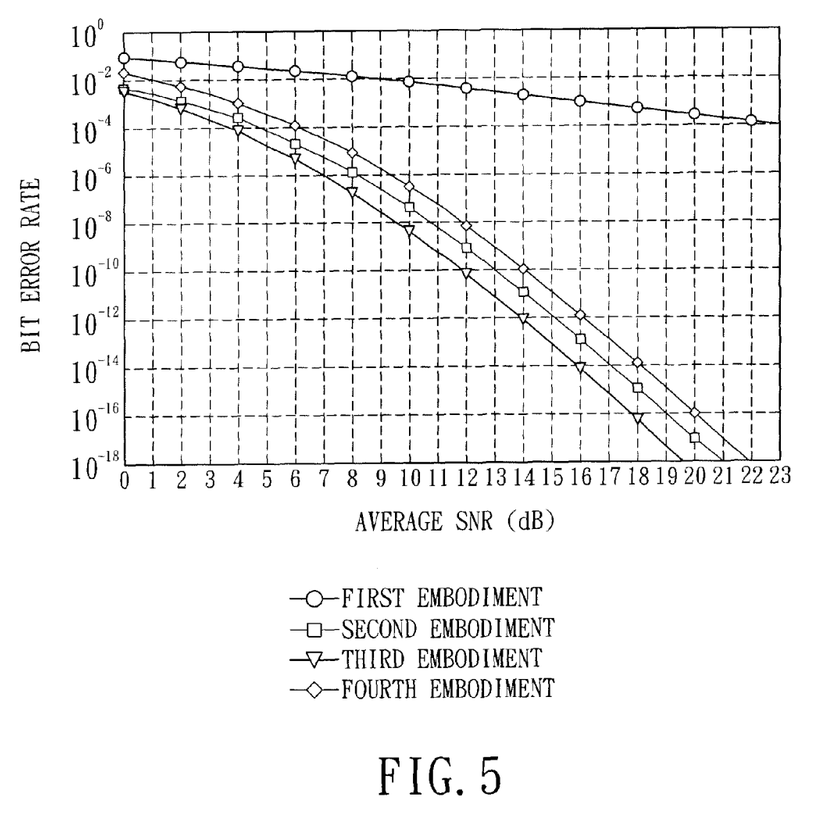
FIG. 5 is a simulation plot for illustrating a relationship between an average signal-to-noise ratio and a bit error rate.

Taking FIG. 5 as an example, it is assumed that K=2 and m=0.7, and the bit error rates $P_{BER}$ corresponding to the respective average SNRs $\overline{Q}$ are computed based upon Equation (1). The symbols ○ in FIG. 5 represent the bit error rates $P_{BER}$ computed using the evaluation device 100 of this embodiment. It can be appreciated that the bit error rates $P_{BER}$ increase with the average SNRs $\overline{Q}$, that is to say, transmission error of the transceiver system 901 decreases and the performance thereof is relatively better.

Figure 6:
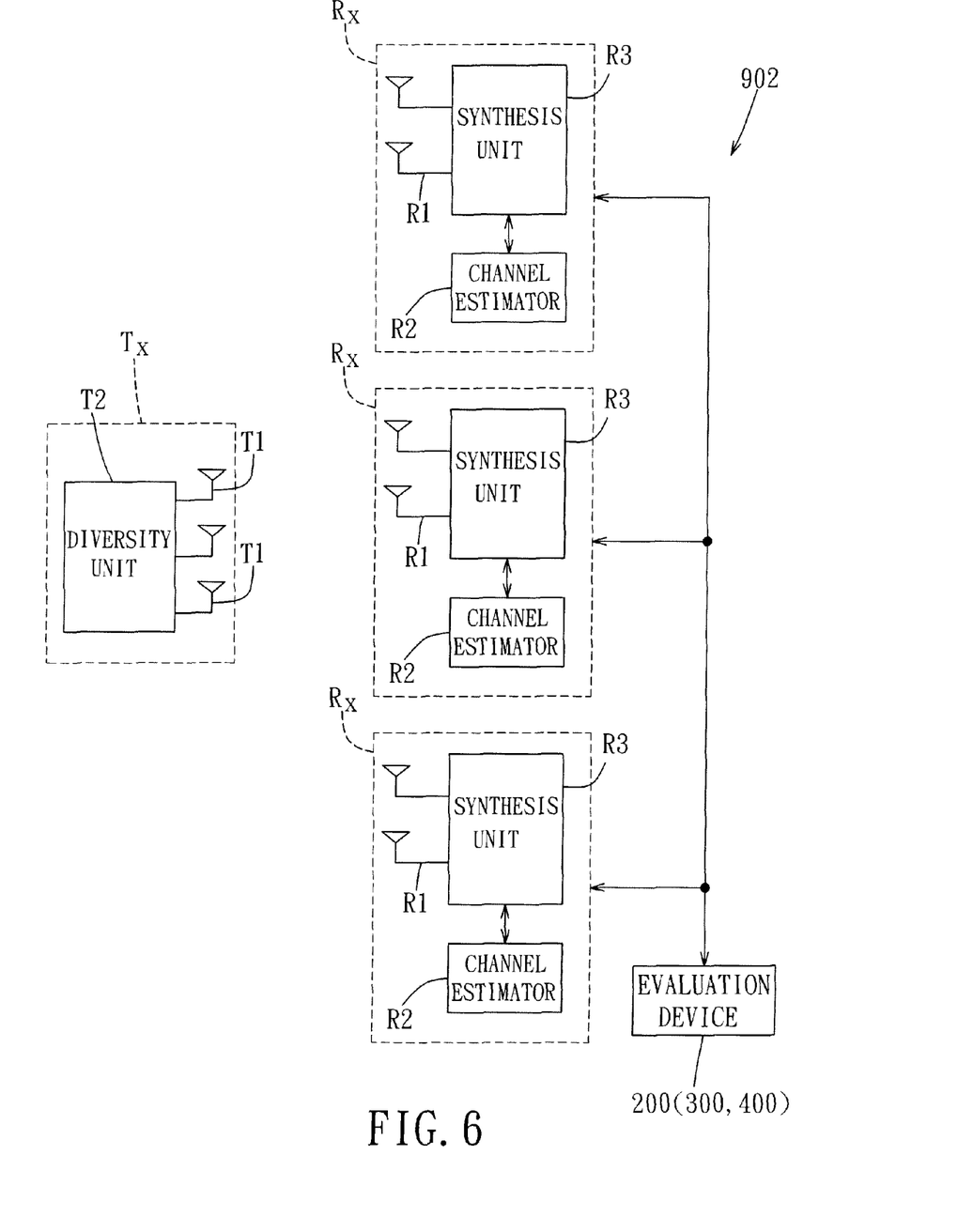
FIG. 6 is a block diagram illustrating a multiple-input multiple-output transceiver system under the multiuser diversity scheme.

Referring to FIG. 6, a second preferred embodiment of an evaluation device 200 of this invention is adapted for providing a transceiver system 902 with performance information thereof. The transceiver system 902 is a multiple-input multiple-output (MIMO) transceiver system under a multiuser diversity scheme, and includes a transmitter (Tx) and a number K (K>1) of receivers (Rx). The transceiver system 902 utilizes a modulation scheme similar to that of the first preferred embodiment (e.g., the BPSK scheme) for conveying data. In this embodiment, the transceiver system 902 utilizes a transmit selective combining/receive selective combining (SC/SC) scheme as an antenna scheme thereof. In practice, the transmitter (Tx) is a base station, and each of the receivers (Rx) is a cell phone of a user. For illustrative purpose, the transceiver system 902 includes three (K=3) of the receivers (Rx) in FIG. 6.

The transmitter (Tx) includes a number $L_T$ ($L_T$>1) of transmit antennas (T1), and a diversity unit (T2). Each of the receivers (Rx) includes a number $L_R$ ($L_R$>1) of receive antennas (R1), a synthesis unit (R3), and a channel estimator (R2). In this embodiment, the evaluation device 200 is operable to model channels between the transmit antennas (T1) and the receive antennas (R1) using Nakagami distribution with an arbitrary positive fading parameter m.

In such a SC/SC scheme, there are a number $L_T \times L_R$ of possible channels for each of the receivers (Rx), and each of the channels is defined by one of the transmit antennas (T1) and one of the receive antennas (R1). The channel estimator (R2) of each of the receivers (Rx) is operable to provide the transmitter (Tx) with transmission qualities of the possible channels corresponding to each of the receivers (Rx). Then, according to the transmission qualities, the diversity unit (T2) of the transmitter (Tx) is operable to determine which one of the receivers (Rx) will be selected as a communication target, and to determine which one of the transmit antennas (T1) will be used to transmit signals. The diversity unit (T2) is further operable to transmit the signals to a selected one of the transmit antennas (T1) for transmission of the signals to the communication target. It should be noted that the communication target is one of the receivers (Rx) that demonstrates the greatest transmission quality with the transmitter (Tx), and the selected one of the transmit antennas (T1) is capable of reaching such transmission quality.

After the selected one of the receivers (Rx), which is selected as the communication target, receives the signals from the transmitter (Tx) through the receive antennas (R1) thereof, the signals are transmitted to the synthesis unit (R3) of the selected one of the receivers (Rx). The synthesis unit (R3) is operable to select one of the signals received by the receive antennas (R1) for analysis.

When the fading parameter m of Nakagami distribution is greater than or equal to ½, the bit error rate of BPSK in the selected one of the signals received by the receive antennas (R1) may be calculated based upon Equation (4).

$$P_{BER} = \frac{1}{2\sqrt{\pi}} \sum_{n=0}^{\infty} \frac{\alpha_n \cdot (m/\overline{Q})^{mKL_TL_R+n} \Gamma(mKL_TL_R + n + 0.5)}{(1 + mKL_TL_R/\overline{Q})^{mKL_TL_R+n+0.5}} \quad (4)$$

In Equation (4), $$\alpha_0 = \left[\frac{1}{\Gamma(m+1)}\right]^{KL_TL_R}, \quad \alpha_n = \frac{1}{n}\sum_{j=1}^{n}\left[\frac{j(KL_TL_R+1)-n}{(m+1)_j} \cdot \alpha_{n-j}\right]$$

for a positive integer n, and $(m+1)_j = \Gamma(m+1+j)/\Gamma(m+1)$.

It could be appreciated from the foregoing that $\alpha_n$ are a sequence of rapidly decreasing convergent numbers, that is to say, $\alpha_{n-1}$ is much greater than $\alpha_n$. Therefore, when the average SNR $\overline{Q}$ is much greater than 1, i.e., greater than a predetermined value, Equation (4) can be simplified as Equation (5). For the procedure of this simplification, one may refer to "A simple and general parameterization quantifying performance in fading channels," Wang Z. et al., *IEEE Trans. Commun.*, August 2003, 51(8), pages 1389-1398.

$$P_{BER} \approx \frac{\Gamma(mKL_TL_R + 0.5) \cdot (m/\overline{Q})^{mKL_TL_R}}{2\sqrt{\pi}\,[\Gamma(m+1)]^{KL_TL_R}} \quad (5)$$

When the fading parameter m of Nakagami distribution is a positive integer, the bit error rate of BPSK in the selected one of the signals received by the receive antennas (R1) may be calculated based upon Equation (6).

$$P_{BER} = \frac{1}{2\sqrt{\pi}} \sum_{i=0}^{KL_TL_R} \binom{KL_TL_R}{i}(-1)^i \sum_{n=0}^{i(m-1)} \frac{\beta_n \cdot (m/\overline{Q})^n \Gamma(n+0.5)}{(1+mi/\overline{Q})^{n+0.5}} \quad (6)$$

In Equation (6), $\beta_0 = 1$, $$\beta_n = \frac{1}{n} \sum_{j=1}^{\min(n,m-1)} \left[ \frac{j(i+1)-n}{j!} \cdot \beta_{n-j} \right]$$

for a positive integer n, and $$\binom{KL_TL_R}{i} = \frac{(KL_TL_R)!}{i!(KL_TL_R - i)!}.$$

The second preferred embodiment of the evaluation device 200 of this invention has a configuration similar to that of the first preferred embodiment, and also includes the SNR setting module 1, the error rate computing module 2, the output module 3, the threshold value computing module 4 and the outage probability computing module 5 shown in FIG. 3. Operations of the modules of the evaluation device 200 in this embodiment are also similar to those of the first preferred embodiment.

In this embodiment, the error rate computing module 2 is operable, in step 73 of the flow chart shown in FIG. 4, to compute the bit error rate $P_{BER}$ based upon the fading parameter m, the average SNR $\overline{Q}$, the number $L_T$ of the transmit antennas (T1), the number $L_R$ of the receive antennas (R1), and the number K of the receivers (Rx).

In practice, the error rate computing module 2 is operable in advance to determine whether the fading parameter m is a positive integer. The error rate computing module 2 is operable to compute the bit error rate $P_{BER}$ based upon Equation (6) when the determination is affirmative, and to compute the bit error rate $P_{BER}$ based upon Equation (4) or (5) when otherwise.

Certainly, in other embodiments, the error rate computing module 2 may be operable in advance to determine whether the fading parameter m is greater than or equal to ½, and to compute the bit error rate $P_{BER}$ based upon Equation (4) or (5) when affirmative.

In particular, when the fading parameter m is not a positive integer, the error rate computing module 2 is operable to compute the bit error rate $P_{BER}$ based upon Equation (5) if the average SNR $\overline{Q}$ is greater than a predetermined value, and to compute the bit error rate $P_{BER}$ based upon Equation (4) if the average SNR $\overline{Q}$ is not greater than the predetermined value. Further, in practice, it is impractical to calculate the summation of the infinite series $$\left( \sum_{n=0}^{\infty} \right)$$

in Equation (4). Therefore, the error rate computing module 2 is operable to compute a limited number of the series. In this embodiment, the error rate computing module 2 is operable to compute the series for n=0~50 when computing the summation.

As an example, when it is assumed that $L_T=1$, $L_R=4$, K=2 and m=0.7, the bit error rates $P_{BER}$ corresponding to the respective average SNRs $\overline{Q}$ may be computed based upon Equation (4) represented by the symbols □ in FIG. 5. The information of the symbols □ could serve as the performance information of the transceiver system 902 in step 76 of the flow chart shown in FIG. 4.

Referring once again to FIG. 6, a third preferred embodiment of an evaluation device 300 of this invention has a configuration similar to that of the second preferred embodiment, and is adapted for providing the MIMO transceiver system 902 with the performance information thereof. In this embodiment, the transceiver system 902 utilizes a transmit selective combining/receive maximum ratio combining (SC/MRC) scheme as an antenna scheme thereof.

In such a SC/MRC scheme, the channel estimator (R2) of each of the receivers (Rx) is operable to provide the transmitter (Tx) with transmission qualities of the possible channels corresponding to each of the receivers (Rx). Then, according to the transmission qualities, the diversity unit (T2) of the transmitter (Tx) is operable to determine which one of the receivers (Rx) will be selected as the communication target, and to determine which one of the transmit antennas (T1) will be used to transmit signals. The diversity unit (T2) is further operable to transmit the signals to a selected one of the transmit antennas (T1) for transmission of the signals to the communication target.

After the selected one of the receivers (Rx), which is selected as the communication target, receives the signals from the transmitter (Tx) through the receive antennas (R1) thereof, the signals are transmitted to the synthesis unit (R3) of the selected one of the receivers (Rx). According to the transmission qualities of the channels between the selected one of the transmit antennas (T1) and the receive antennas (R1), the synthesis unit (R3) is operable to weight the signals received by the receive antennas (R1) so as to obtain a synthesized signal.

When the fading parameter m of Nakagami distribution is greater than or equal to ½, the bit error rate of BPSK in the synthesized signal may be calculated based upon Equation (7).

$$P_{BER} = \frac{1}{2\sqrt{\pi}} \sum_{n=0}^{\infty} \frac{\alpha_n \cdot (m/\overline{Q})^{mKL_TL_R+n}\Gamma(mKL_TL_R+n+0.5)}{(1+mKL_T/\overline{Q})^{mKL_TL_R+n+0.5}} \quad (7)$$

In Equation (7), $$\alpha_0 = \left[ \frac{1}{\Gamma(m+1)} \right]^{KL_T}, \quad \alpha_n = \frac{1}{n} \sum_{j=1}^{n} \left[ \frac{j(KL_T+1)-n}{(mL_R+1)_j} \cdot \alpha_{n-j} \right]$$

for a positive integer n, and $(mL_R+1)_j = \Gamma(mL_R+1+j)/\Gamma(mL_R+1)$.

Similar to the foregoing description in connection with the second preferred embodiment, Equation (7) can be simplified as Equation (8) when the average SNR $\overline{Q}$ is much greater than 1, i.e., greater than a predetermined value.

$$P_{BER} = \frac{\Gamma(mKL_T/\overline{Q} + 0.5) \cdot (mL_R)^{mKL_T/\overline{Q}}}{2\sqrt{\pi}\,[\Gamma(m/\overline{Q}+1)]^{KL_T}} \quad (8)$$

When the fading parameter m of Nakagami distribution is a positive integer, the bit error rate of BPSK in the synthesized signal may be calculated based upon Equation (9).

$$P_{BER} = \frac{1}{2\sqrt{\pi}} \sum_{i=0}^{KL_T} \binom{KL_T}{i}(-1)^i \sum_{n=0}^{i(mL_R-1)} \frac{\beta_n \cdot (m/\overline{Q})^n \Gamma(n+0.5)}{(1+mi/\overline{Q})^{n+0.5}} \quad (9)$$

In Equation (9), $\beta_0 = 1$, $$\beta_n = \frac{1}{n} \sum_{j=1}^{\min(n, mL_R-1)} \left[ \frac{j(i+1)-n}{j!} \cdot \beta_{n-j} \right]$$

for a positive integer n, and $$\binom{KL_T}{i} = \frac{(KL_T)!}{i!(KL_T-i)!}.$$

The third preferred embodiment of the evaluation device 300 of this invention has a configuration similar to that of the first preferred embodiment, and also includes the SNR setting module 1, the error rate computing module 2, the output module 3, the threshold value computing module 4 and the outage probability computing module 5 shown in FIG. 3. Operations of the modules of the evaluation device 300 in this embodiment are also similar to those the first preferred embodiment.

In this embodiment, the error rate computing module 2 is operable, in step 73 of the flow chart shown in FIG. 4, to compute the bit error rate $P_{BER}$ based upon the fading parameter m, the average SNR $\overline{Q}$, the number $L_T$ of the transmit antennas (T1), the number $L_R$ of the receive antennas (R1), and the number K of the receivers (Rx).

In practice, the error rate computing module 2 is operable in advance to determine whether the fading parameter m is a positive integer. The error rate computing module 2 is operable to compute the bit error rate $P_{BER}$ based upon Equation (9) when the determination is affirmative, and to compute the bit error rate $P_{BER}$ based upon Equation (7) or (8) when otherwise.

Certainly, in other embodiments, the error rate computing module 2 may be operable in advance to determine whether the fading parameter m is greater than or equal to ½, and to compute the bit error rate $P_{BER}$ based upon Equation (7) or (8) when affirmative.

In particular, when the fading parameter m is not a positive integer, the error rate computing module 2 is operable to compute the bit error rate $P_{BER}$ based upon Equation (8) if the average SNR $\overline{Q}$ is greater than a predetermined value, and to compute the bit error rate $P_{BER}$ based upon Equation (7) if the average SNR $\overline{Q}$ is not greater than the predetermined value. Further, in practice, it is impractical to calculate the summation of the infinite series $$\left( \sum_{n=0}^{\infty} \right)$$

in Equation (7). Therefore, the error rate computing module 2 is operable to compute a limited number of the series. In this embodiment, the error rate computing module 2 is operable to compute the series for n=0~50 when computing the summation.

As an example, when it is assumed that $L_T=1$, $L_R=4$, $K=2$ and m=0.7, the bit error rates $P_{BER}$ corresponding to the respective average SNRs $\overline{Q}$ may be computed based upon Equation (7) represented by the symbols $\nabla$ in FIG. 5. The information of the symbols $\nabla$ could serve as the performance information of the transceiver system 902 in step 76 of the flow chart shown in FIG. 4.

Referring again to FIG. 6, a fourth preferred embodiment of an evaluation device 400 of this invention has a configuration similar to that of the second preferred embodiment, and is adapted for providing the MIMO transceiver system 902 with the performance information thereof. In this embodiment, the transceiver system 902 utilizes a space-time block codes (STBC) scheme as an antenna scheme thereof.

In such a STBC scheme, the channel estimator (R2) of each of the receivers (Rx) is operable to provide the transmitter (Tx) with transmission qualities of the possible channels corresponding to each of the receivers (Rx). Then, according to the transmission qualities, the diversity unit (T2) of the transmitter (Tx) is operable to determine which one of the receivers (Rx) will be selected as the communication target. The diversity unit (T2) is further operable to encode a to-be-transmitted signal using space-time block coding, and to transmit the coded signal to the communication target through each of the transmit antennas (T1).

After the selected one of the receivers (Rx), which is selected as the communication target, receives the coded signals from the transmitter (Tx) through the receive antennas (R1) thereof, the coded signals are transmitted to the synthesis unit (R3) of the selected one of the receivers (Rx). Then, the synthesis unit (R3) is operable to decode the coded signals received by the receive antennas (R1) so as to obtain a decoded signal. Since the space-time block coding/decoding is well known to those skilled in the art, details thereof will be omitted herein for the sake of brevity.

When the fading parameter m of Nakagami distribution is greater than or equal to ½, the bit error rate of BPSK in the decoded signal may be calculated based upon Equation (10).

$$P_{BER} = \frac{1}{2\sqrt{\pi}} \sum_{n=0}^{\infty} \frac{\alpha_n \cdot (mL_T/\overline{Q})^{mKL_T L_R + n} \Gamma(mKL_T L_R + n + 0.5)}{(1+mKL_T/\overline{Q})^{mKL_T L_R + n + 0.5}} \quad (10)$$

In Equation (10), $$\alpha_0 = \left[\frac{1}{\Gamma(mL_TL_R+1)}\right]^K, \alpha_n = \frac{1}{n}\sum_{j=1}^{n}\left[\frac{j(K+1)-n}{(mL_TL_R+1)_j}\cdot\alpha_{n-j}\right]$$

for a positive integer n, and $(mL_TL_R+1)_j = \Gamma(mL_TL_R+1+j)/\Gamma(mL_TL_R+1)$.

Similar to the foregoing description in connection with the second preferred embodiment, Equation (10) can be simplified as Equation (11) when the average SNR $\overline{Q}$ is much greater than 1, i.e., greater than a predetermined value.

$$P_{BER} \approx \frac{\Gamma(mKL_TL_R+0.5)\cdot(mL_T/\overline{Q})^{mKL_TL_R}}{2\sqrt{\pi}\left[\Gamma(mL_TL_R+1)\right]^K} \quad (11)$$

When the fading parameter m of Nakagami distribution is a positive integer, the bit error rate of BPSK in the decoded signal may be calculated based upon Equation (12).

$$P_{BER} = \frac{1}{2\sqrt{\pi}}\sum_{i=0}^{K}\binom{K}{i}(-1)^i\sum_{n=0}^{i(mL_TL_R-1)}\frac{\beta_n\cdot(mL_T/\overline{Q})^n\Gamma(n+0.5)}{(1+miL_T/\overline{Q})^{n+0.5}} \quad (12)$$

In Equation (12), $$\binom{K}{i} = \frac{(K)!}{i!(K-i)!},$$

$\beta_0 = 1$, and $$\beta_n = \frac{1}{n}\sum_{j=1}^{\min(n,mL_TL_R-1)}\left[\frac{j(i+1)-n}{j!}\cdot\beta_{n-j}\right]$$

for a positive integer n.

The fourth preferred embodiment of the evaluation device 400 of this invention has a configuration similar to that of the first preferred embodiment, and also includes the SNR setting module 1, the error rate computing module 2, the output module 3, the threshold value computing module 4 and the outage probability computing module 5 shown in FIG. 3. Operations of the modules of the evaluation device 400 in this embodiment are also similar to those of the first preferred embodiment.

In this embodiment, the error rate computing module 2 is operable, in step 73 of the flow chart shown in FIG. 4, to compute the bit error rate $P_{BER}$ based upon the fading parameter m, the average SNR $\overline{Q}$, the number $L_T$ of the transmit antennas (T1), the number $L_R$ of the receive antennas (R1), and the number K of the receivers (Rx).

In practice, the error rate computing module 2 is operable in advance to determine whether the fading parameter m is a positive integer. The error rate computing module 2 is operable to compute the bit error rate $P_{BER}$ based upon Equation (12) when the determination is affirmative, and to compute the bit error rate $P_{BER}$ based upon Equation (10) or (11) when otherwise.

Certainly, in other embodiments, the error rate computing module 2 may be operable in advance to determine whether the fading parameter m is greater than or equal to ½, and to compute the bit error rate $P_{BER}$ based upon Equation (10) or (11) when affirmative.

In particular, when the fading parameter m is not a positive integer, the error rate computing module 2 is operable to compute the bit error rate $P_{BER}$ based upon Equation (11) if the average SNR $\overline{Q}$ is greater than a predetermined value, and to compute the bit error rate $P_{BER}$ based upon Equation (10) if the average SNR $\overline{Q}$ is not greater than the predetermined value. Further, in practice, it is impractical to calculate the summation of the infinite series $$\left(\sum_{n=0}^{\infty}\right)$$

in Equation (10). Therefore, the error rate computing module 2 is operable to compute a limited number of the series. In this embodiment, the error rate computing module 2 is operable to compute the series for n=0~50 when computing the summation.

As an example, when it is assumed that $L_T=1$, $L_R=4$, K=2 and m=0.7, the bit error rates $P_{BER}$ corresponding to the respective average SNRs $\overline{Q}$ may be computed based upon Equation (10) represented by the symbols ◇ in FIG. 5. The information of the symbols ◇ could serve as the performance information of the transceiver system 902 in step 76 of the flow chart shown in FIG. 4.

In the disclosed embodiments, the output module 3 is operable to provide the transceiver system 901, 902 with the bit error rate $P_{BER}$ and the outage probability corresponding to each of the average SNRs $\overline{Q}$ set in step 72 as the performance information of the transceiver system 901, 902. However, in other embodiments, the output module 3 may be operable to provide only the bit error rate $P_{BER}$ corresponding to each of the average SNRs $\overline{Q}$, or only the outage probability corresponding to each of the average SNRs $\overline{Q}$ as the performance information. Further, Equations (1) to (12) are still practical when the number of the receivers (Rx) is equal to 1 (K=1).

In conclusion, the fading parameter m of Nakagami channels is not limited to a positive integer in the present invention. The error rate computing module 2 is capable of computing the bit error rate $P_{BER}$ with the fading parameter m that is an arbitrary positive integer, or that is equal to or greater than ½. Therefore, the evaluation device according to this invention is suitable for simulation of the channels of the transceiver system with various fading levels in a metropolis. Therefore, the evaluation device according to the present invention is suitable for simulating the performance of the transceiver system in a metropolis.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An evaluation device adapted for providing a transceiver system with performance information thereof, the transceiver system including a transmitter and a number K of receivers, and modeling a channel between the transmitter and each of the receivers using Nakagami distribution with a fading parameter, said evaluation device comprising:

a signal-to-noise ratio (SNR) setting module operable to set an average SNR for the channel between the transmitter and each of the receivers of the transceiver system;

an error rate computing module operable to compute a bit error rate over the channel between the transmitter and each of the receivers, when the fading parameter m is greater than or equal to ½, said error rate computing module being operable to compute the bit error rate $P_{BER}$ based upon $$P_{BER} = \frac{1}{2\sqrt{\pi}} \sum_{n=0}^{n'} \frac{\alpha_n \cdot (m/\overline{Q})^{mK+n} \Gamma(mK+n+0.5)}{(1+mK/\overline{Q})^{mK+n+0.5}},$$

where $\overline{Q}$ is the average SNR, $$\alpha_0 = \left[\frac{1}{\Gamma(m+1)}\right]^K,$$

$$\alpha_n = \frac{1}{n} \sum_{j=1}^{n} \left[\frac{j(K+1)-n}{(m+1)_j} \cdot \alpha_{n-j}\right]$$

for a positive integer n, $(m+1)_j = \Gamma(m+1+j)/\Gamma(m+1)$, $$\Gamma(z) = \int_0^\infty t^{z-1} e^{-t} dt$$

for an arbitrary positive number z, and n' is an arbitrary positive integer; and an output module operable to provide the transceiver system with the average SNR and the bit error rate as the performance information of the transceiver system.

2. The evaluation device as claimed in claim 1, wherein
when the fading parameter m is greater than or equal to ½, and the average SNR $\overline{Q}$ is greater than a predetermined value, said error rate computing module is operable to compute the bit error rate $P_{BER}$ based upon $$P_{BER} = \frac{\Gamma(mK+0.5) \cdot (m/\overline{Q})^{mK}}{2\sqrt{\pi} \left[\Gamma(m+1)\right]^K},$$

Where $$\Gamma(z) = \int_0^\infty t^{z-1} e^{-t} dt$$

for an arbitrary positive number z.

3. The evaluation device as claimed in claim 1, wherein
when the fading parameter m is a positive integer, said error rate computing module is operable to compute the bit error rate $P_{BER}$ based upon $$P_{BER} = \frac{1}{2\sqrt{\pi}} \sum_{i=0}^{K} \binom{K}{i} (-1)^i \sum_{n=0}^{i(m-1)} \frac{\beta_n \cdot (m/\overline{Q})^n \Gamma(n+0.5)}{(1+mi/\overline{Q})^{n+0.5}},$$

where $\overline{Q}$ is the average SNR, $\beta_0 = 1$, $$\beta_n = \frac{1}{n} \sum_{j=1}^{min(n,m-1)} \left[\frac{j(i+1)-n}{j!} \cdot \beta_{n-j}\right]$$

for a positive integer n, $$\binom{K}{i} = \frac{(K)!}{i!(K-i)!},$$

and $$\Gamma(z) = \int_0^\infty t^{z-1} e^{-t} dt$$

for an arbitrary positive number z.

4. The evaluation device as claimed in claim 1, each of the receivers having a number $L_R$ of receive antennas under a transmit selective combining/receive selective combining (SC/SC) scheme, the transmitter having a number $L_T$ of transmit antennas, wherein
when the fading parameter m is greater than or equal to ½, said error rate computing module is operable to compute the bit error rate $P_{BER}$ based upon $$P_{BER} = \frac{1}{2\sqrt{\pi}} \sum_{n=0}^{n'} \frac{\alpha_n \cdot (m/\overline{Q})^{mKL_T L_R + n} \Gamma(mKL_T L_R + n + 0.5)}{(1+mKL_T L_R/\overline{Q})^{mKL_T L_R + n + 0.5}},$$

where Q is the average SNR, $$\alpha_0 = \left[\frac{1}{\Gamma(m+1)}\right]^{KL_T L_R},$$

$$\alpha_n = \frac{1}{n} \sum_{j=1}^{n} \left[\frac{j(KL_T L_R + 1) - n}{(m+1)_j} \cdot \alpha_{n-j}\right]$$

for a positive integer n, $(m+1)_j = \Gamma(m+1+j)/\Gamma(m+1)$, $$\Gamma(z) = \int_0^\infty t^{z-1} e^{-t} dt$$

for an arbitrary positive number z, and n' is an arbitrary positive integer.

5. The evaluation device as claimed in claim 1, each of the receivers having a number $L_R$ of receive antennas under a transmit selective combining/receive selective combining (SC/SC) scheme, the transmitter having a number $L_T$ of transmit antennas, wherein
when the fading parameter m is greater than or equal to ½, and the average SNR $\overline{Q}$ is greater than a predetermined value, said error rate computing module is operable to compute the bit error rate $P_{BER}$ based upon $$P_{BER} = \frac{\Gamma(mKL_TL_R + 0.5) \cdot (m/\overline{Q})^{mKL_TL_R}}{2\sqrt{\pi}\,[\Gamma(m+1)]^{KL_TL_R}},$$

where $$\Gamma(z) = \int_0^\infty t^{z-1} e^{-t}\, dt$$

for an arbitrary positive number z.

6. The evaluation device as claimed in claim 1, each of the receivers having a number $L_R$ of receive antennas under a transmit selective combining/receive selective combining (SC/SC) scheme, the transmitter having a number $L_T$ of transmit antennas, wherein when the fading parameter m is a positive integer, said error rate computing module is operable to compute the bit error rate $P_{BEER}$ based upon $$P_{BER} = \frac{1}{2\sqrt{\pi}} \sum_{i=0}^{KL_TL_R} \binom{KL_TL_R}{i} (-1)^i \sum_{n=0}^{i(m-1)} \frac{\beta_n \cdot (m/\overline{Q})^n \Gamma(n+0.5)}{(1 + mi/\overline{Q})^{n+0.5}},$$

where $\overline{Q}$ is the average SNR, $\beta_0 = 1$, $$\beta_n = \frac{1}{n} \sum_{j=1}^{\min(n,m-1)} \left[ \frac{j(i+1)-n}{j!} \cdot \beta_{n-j} \right]$$

for a positive integer n, $$\binom{KL_TL_R}{i} = \frac{(KL_TL_R)!}{i!(KL_TL_R - i)!},$$

and $$\Gamma(z) = \int_0^\infty t^{z-1} e^{-t}\, dt$$

for an arbitrary positive number z.

7. The evaluation device as claimed in claim 1, each of the receivers having a number $L_R$ of receive antennas under a transmit selective combining/receive maximum ratio combining (SC/MRC) scheme, the transmitter having a number $L_T$ of transmit antennas, wherein when the fading parameter m is greater than or equal to ½, said error rate computing module is operable to compute the bit error rate $P_{EER}$ based upon $$P_{BER} = \frac{1}{2\sqrt{\pi}} \sum_{n=0}^{n'} \frac{\alpha_n \cdot (m/\overline{Q})^{mKL_TL_R+n} \Gamma(mKL_TL_R + n + 0.5)}{(1 + mKL_T/\overline{Q})^{mKL_TL_R+n+0.5}},$$

where $\overline{Q}$ is the average SNR, $$\alpha_0 = \left[\frac{1}{\Gamma(m+1)}\right]^{KL_T},$$

and $$\alpha_n = \frac{1}{n} \sum_{j=1}^{n} \left[ \frac{j(KL_T+1)-n}{(mL_R+1)_j} \cdot \alpha_{n-j} \right]$$

for a positive integer n, $(mL_R+1)_j = \Gamma(mL_R+1+j)/\Gamma(mL_R+1)$, $$\Gamma(z) = \int_0^\infty t^{z-1} e^{-t}\, dt$$

for an arbitrary positive number z, and n' is an arbitrary positive integer.

8. The evaluation device as claimed in claim 1, each of the receivers having a plurality of receive antennas under a transmit selective combining/receive maximum ratio combining (SC/MRC) scheme, the transmitter having a number $L_T$ of transmit antennas, wherein when the fading parameter m is greater than or equal to ½, and the average SNR $\overline{Q}$ is greater than a predetermined value, said error rate computing module is operable to compute the bit error rate $P_{BER}$ based upon $$P_{BER} = \frac{\Gamma(mKL_T/\overline{Q} + 0.5) \cdot (mL_R)^{mKL_T/\overline{Q}}}{2\sqrt{\pi}\,[\Gamma(m/\overline{Q} + 1)]^{KL_T}},$$

where $$\Gamma(z) = \int_0^\infty t^{z-1} e^{-t}\, dt$$

for an arbitrary positive number z.

9. The evaluation device as claimed in claim 1, each of the receivers having a number $L_R$ of receive antennas under a transmit selective combining/receive maximum ratio combining (SC/MRC) scheme, the transmitter having a number $L_T$ of transmit antennas, wherein when the fading parameter m is a positive integer, said error rate computing module is operable to compute the bit error rate $P_{BER}$ based upon $$P_{BER} = \frac{1}{2\sqrt{\pi}} \sum_{i=0}^{KL_T} \binom{KL_T}{i} (-1)^i \sum_{n=0}^{i(mL_R-1)} \frac{\beta_n \cdot (m/\overline{Q})^n \Gamma(n+0.5)}{(1 + mi/\overline{Q})^{n+0.5}},$$

where $\overline{Q}$ is the average SNR, $\beta_0 = 1$, $$\beta_n = \frac{1}{n} \sum_{j=1}^{min(n,mL_R-1)} \left[ \frac{j(i+1)-n}{j!} \cdot \beta_{n-j} \right]$$

for a positive integer n, $$\binom{KL_T}{i} = \frac{(KL_T)!}{i!(KL_T - i)!},$$

and $$\Gamma(z) = \int_0^\infty t^{z-1} e^{-t} dt$$

for an arbitrary positive number z.

10. The evaluation device as claimed in claim 1, each of the receivers having a number $L_R$ of receive antennas under a space-time block codes (STBC) scheme, the transmitter having a number $L_T$ of transmit antennas, wherein
when the fading parameter m is greater than or equal to ½, said error rate computing module is operable to compute the bit error rate $P_{BER}$ based upon $$P_{BER} = \frac{1}{2\sqrt{\pi}} \sum_{n=0}^{n'} \frac{\alpha_n \cdot (mL_T/\overline{Q})^{mKL_TL_R+n} \Gamma(mKL_TL_R + n + 0.5)}{(1 + mKL_T/\overline{Q})^{mKL_TL_R+n+0.5}},$$

where $\overline{Q}$ is the average SNR, $$\alpha_0 = \left[\frac{1}{\Gamma(mL_TL_R+1)}\right]^K, \quad \alpha_n = \frac{1}{n} \sum_{j=1}^{n} \left[\frac{j(K+1)-n}{(mL_TL_R+1)_j} \cdot \alpha_{n-j}\right]$$

for a positive integer n, $(mL_TL_R+1)_j = \Gamma(mL_TL_R+1+j)/\Gamma(mL_TL_R+1)$, $$\Gamma(z) = \int_0^\infty t^{z-1} e^{-t} dt$$

for an arbitrary positive number z, and n' is an arbitrary positive integer.

11. The evaluation device as claimed in claim 1, each of the receivers having a plurality of receive antennas under a space-time block codes (STBC) scheme, the transmitter having a number $L_T$ of transmit antennas, wherein
when the fading parameter m is greater than or equal to ½, and the average SNR $\overline{Q}$ is greater than a predetermined value, said error rate computing module is operable to compute the bit error rate $P_{BER}$ based upon $$P_{BER} = \frac{\Gamma(mKL_TL_R + 0.5) \cdot (mL_T/\overline{Q})^{mKL_TL_R}}{2\sqrt{\pi} \left[\Gamma(mL_TL_R + 1)\right]^K},$$

where $$\Gamma(z) = \int_0^\infty t^{z-1} e^{-t} dt$$

for an arbitrary positive number z.

12. The evaluation device as claimed in claim 1, each of the receivers having a number $L_R$ of receive antennas under a space-time block codes (STBC) scheme, the transmitter having a number $L_T$ of transmit antennas, wherein
when the fading parameter m is a positive integer, said error rate computing module is operable to compute the bit error rate $P_{BER}$ based upon $$P_{BER} = \frac{1}{2\sqrt{\pi}} \sum_{i=0}^{K} \binom{K}{i} (-1)^i \sum_{n=0}^{i(mL_TL_R-1)} \frac{\beta_n \cdot (mL_T/\overline{Q})^n \Gamma(n+0.5)}{(1 + miL_T/\overline{Q})^{n+0.5}},$$

where $\overline{Q}$ is the average SNR, $\beta_0=1$, $$\beta_n = \frac{1}{n} \sum_{j=1}^{min(n,mL_TL_R-1)} \left[\frac{j(i+1)-n}{j!} \cdot \beta_{n-j}\right]$$

for a positive integer n, $$\binom{K}{i} = \frac{(K)!}{i!(K-i)!},$$

and $$\Gamma(z) = \int_0^\infty t^{z-1} e^{-t} dt$$

for an arbitrary positive number z.

13. The evaluation device as claimed in claim 1, further comprising:
a threshold value computing module operable to compute a threshold value based upon a given capacity; and
an outage probability computing module operable, based upon the fading parameter, the number of the receivers, the average SNR and the threshold value, to compute an outage probability of the transceiver system corresponding to the given capacity;
said output module being operable to provide the transceiver system with the average SNR, the bit error rate and the outage probability as the performance information of the transceiver system.

* * * * *